Patented Jan. 14, 1941

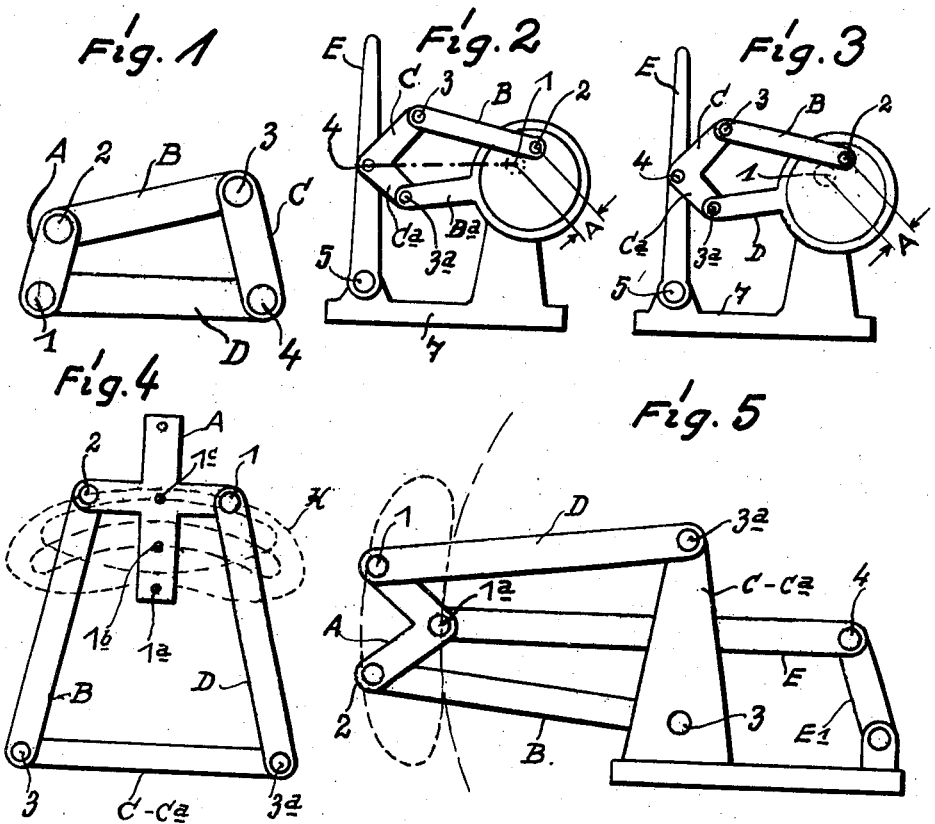
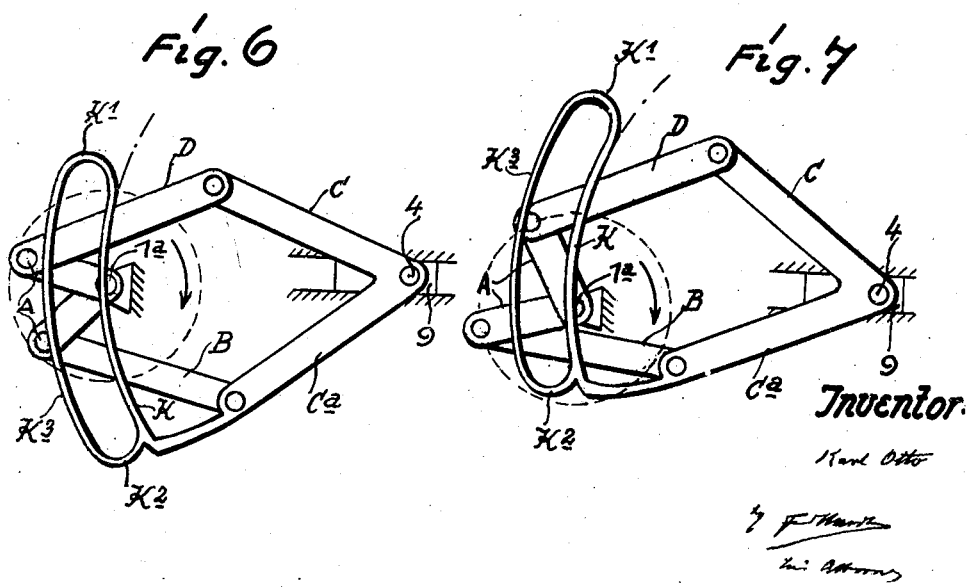

2,228,400

UNITED STATES PATENT OFFICE 2,228,400

FOUR-LINKS CHAIN MECHANISM WITH TWO-ARMED LINK MOTION

Karl Otto, Cologne, Germany

Application April 5, 1938, Serial No. 200,099
In Germany September 16, 1937

3 Claims. (Cl. 74—43)

By a kinematic chain is understood in the transmission gear teaching a number of links movably connected the one with the other. For forming a transmission gear closed kinematic chains are required, that is such chains in which the movement of one link positively causes a movement of the other links.

The simplest form of closed, kinematic chains is the four-links chain. From it the others, also those transmission gears comprising more than four links, can be derived.

In the accompanying drawings

Fig. 1 shows a four-links chain of known type.

Fig. 2 shows a transmission gear of known type, such as employed for instance for moving the slay sword of mechanical looms.

In Fig. 3 the elements of Fig. 2 with similar functions of the link elements are shown.

Fig. 4 shows the four-links chain hingedly mounted on the link-motion element.

Fig. 5 shows the derivation of a standstill, for instance from the crank point.

Figure 8:
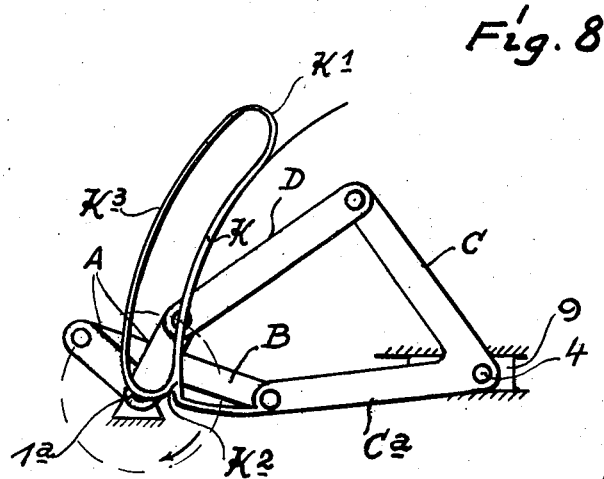

Figs. 6, 7 and 8 show a modified construction according to which the link connection shown in Fig. 5 is detached from the frame and connected with the main hinge point on an angular link motion.

Figure 9:
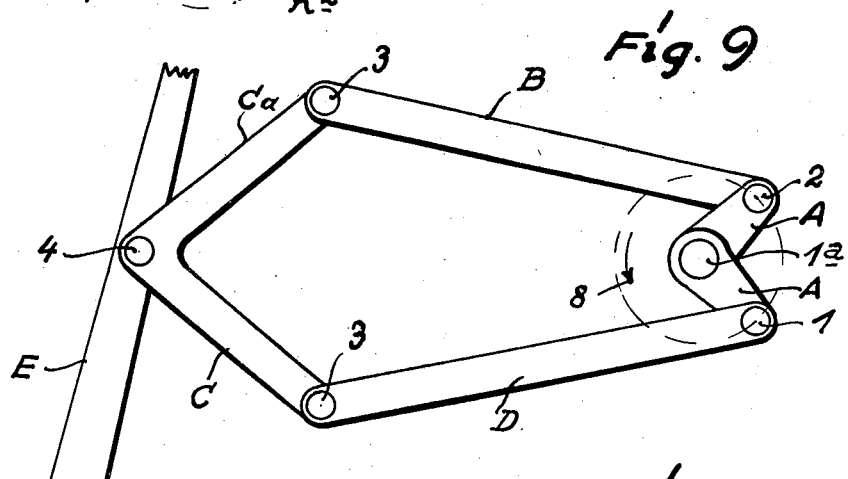

Fig. 9 shows the angular link-motion suspended on a link, and

Figure 10:
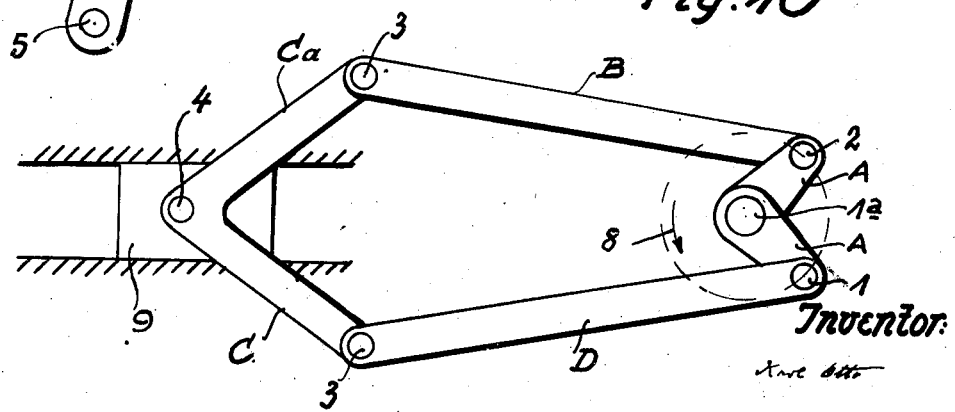

Fig. 10 shows the hinge point of the angular link-motion guided in a straight guide.

A form of construction of the four-links chain is shown in Fig. 1. The link designated by A turning about the point 1 forms the crank, the link B hingedly mounted on the crank end 2 may be called the junction, the link C hingedly connected at 3 with link B may be called the swing-motion and the end element D connecting the hinge point 4 of link B with the hinge point 1 may be called the web.

Transmission gears of the type shown in Fig. 2 have also become known. They are employed for instance for moving the slay sword of mechanical looms and destined to produce during the two reversing positions of the link designated by E, or only during one of these reversing positions, said link swinging on the frame 7 about the hinge point 5, an immobility nearly equal or almost equal to the standstill of the link.

At the first glance it seems to be difficult to incorporate the transmission gear of the latter type into the four-links-chain system shown in Fig. 1. As understood up to the present, the transmission gear shown in Fig. 2 consists of the combination of two four-links chains in form of curved sliding crank gears, that is of the upper links A—B—C and of the lower links $A^1$—$B^a$—$C^a$ with an end link common to the two groups of links. It would, however, then be incorrect, to regard the dash-dot line in Fig. 1 between the hinge points 1 and 4 as end link, or the interpretation as if this end link had been replaced in the link group A—B—C above the dash-dot line by the link group $A^1$—$B^a$—$C^a$ below the dash-pot line.

These erroneous ideas were also the reason why the means were not sufficient with which it had been proposed to attain by adaptation of the transmission gears according to Fig. 2 to the changing conditions of the loom the arrangement necessary for the obtention of a standstill period in the slay movement of mechanical looms favorable for every individual case.

One believed for instance to be able to adapt the transmission gears as shown in Fig. 2 to the changing service conditions and constructions of the looms by altering the crank lengths A—$A^1$ by changing the arm-lengths of the link elements C and $C^a$ on the link motion, by displacing the angle enclosed by the arms C—$C^a$ or of the angle which lies between the crank A and the line of eccentric oscillation of the link $B^a$, without, however, attaining by this empiric method the desired aim of satisfactory motion conditions legally and with all security from the first in a similar favorable manner. This was understandable if one considers that, already the fundamental idea about this transmission gear arrangement as a curved sliding crank gear composed of two four-links chains, is wrong, because this arrangement has really nothing to do with an acting in unison and counter-acting of two gears, but, as will be explained hereinafter, a single gear.

Correct results and the success according to the invention, that is an immobilising movement of the gear elements coming into consideration, adapted to the actual changing conditions, are, however, arrived at if the transmission gear shown in Fig. 2 is not considered as acting in unison and counter-acting of two four-links chains to one curved sliding gear, but as single gear arrangement of a coupling curve problem. As in this case, it is not the result of superposition of two motion-diagrams but the finding out and determination of certain coupling-curve-sections of absolutely or approximately similar curvature radius, by means of which the quality condition of the immobilities of certain elements of the transmission gear can be accurately adapted to the changing conditions and legally determined beforehand.

To make more clear these forms of construction and the existence of a four-links chain in Fig. 2, the link elements equipped in Fig. 3 with similar functions as in Fig. 1 shall have the same external surface characteristics which they have had in Fig. 1, that means in both instances the crank element will be indicated by cross-hatching, the coupling element by dotted lines, the link-motion element in white and the web element D by simple hatching.

It seems to be necessary, for the understanding of the behaviour of the links and of individual points, for instance of the crank bearing point of the lever arm A designated by 1 in the Figs. 2 and 3, to imagine how the transmission gear shown in Figs. 2 and 3 would behave if is is assumed that point 1 were movable within the motion plane of the links B and D, but the arms C—Ca of the link-motion were stationary. The four-links chain in Figs. 2 and 3 swinging in the space with the four hinge-points 2a—2—3—3a is therefore fixed in the link-motion element C—Ca with the hinge points 3—3a, as shown in Fig. 4.

It be supposed that the frame, for which here a simple rigidly mounted link beam (C—Ca) is substituted, were connected at one end with the coupling B and at the other end with the web D by a two-armed crank A connecting all elements to form a four-links chain, any desired crank points 1a, 1b and 1c being indicated. The movements of these points will be described and explained. These crank points describe during the rotation of the crank certain paths, indicated in dash lines and which may be called crank- or coupling curves. They give the picture of the paths along which the crank moves during the movement of the four-links chain. This picture is important in order to be able to ascertain from the actual position of the points of the crank moved and considered relative to the not moved link element C—Ca, whether and when the gear in the course of its movement and in relation to the link C—Ca supplies a standstill and of which duration the standstill is.

When regarding the three curves shown in Fig. 4 it can be seen at once that every one of these curves comprises sections in which the curvature remains unchanged for a longer time, that is that certain curved portions form sections of an arc and are suitable for the obtention of a longer standstill.

The constructive execution of a standstill derivation from for instance crank point 1a is indicated in Fig. 5. The point 1a and the corresponding centre of curvature 4 are connected by a link E designated by dash line hatching, the length of which link corresponds to the length of the radius of the arc shown in dash lines coinciding with the curvature of the curve described by point 1a of the double crank A and further connects the link E at point 4 with a second arm E₁ oscillatably mounted in the frame C—Ca. The point 1a of the double crank describes then, during the movement of this transmission gear, the curve shown in dash lines and approximately of kidney shape, in which a portion coincides with an arc. The hinge point 4 remains therefor in the arrangement shown in Fig. 5 as long at rest and the link E turns in the end of the arm of E¹ as long as they move along the curved portion of the kidney shaped curve which coincides with the arc section.

A similar result is obtained if the hinge points 3—3a of the link connection E—E¹ of the arrangement shown in Fig. 5 is removed from the frame C—Ca and connected with the point 4 in a suitable manner, for instance by an angular swing motion C—Ca as shown in Figs. 6, 7 and 8. In these figures three positions of the links A, B, C, Ca and D are shown, a straight guide being selected as example for the movement of point 4 of the angular swing-motion C—Ca, and it is supposed that the double crank A turns about point 1a in the direction of the arrow. Fig. 6 shows the position of the links in the upper portion of the immobility arc, Fig. 7 the positions during the moving through the lower portion of the immobility arc K, and Fig. 8 shows the position of the chain links on the lower transition curve K² between the two immobility arcs K and K³, the curve described by the point 1a being shown for clearness' sake as curve body which is rigidly connected with one of the link-motion arms, for example with the arm Ca.

The illustrations show that as long as point 1a moves for instance in the arc K of the coupling curve, also point 4 remains in the same distance from 1a, i. e. is at standstill; during the other positions this distance is greater and the movement of the point 4 corresponds to the curve shape K—K¹—K²—K³.

As the curve point 1a can now move through its curve as had been supposed in Fig. 5, in case it ought to be mounted stationary on the frame, the curve must, as shown in Figs. 6 to 8, move over the curve point and with this object in view the link-motion element C—Ca must move to and fro not only in the direction to the crank point, but further be able to carry out a movement perpendicular thereto, this being possible, as shown in Fig. 9, owing to the suspension of the link-motion C—Ca on a link or, as shown in Fig. 10, by mounting the point of oscillation 4 in a straight guide.

According to the arrangement illustrated in Figs. 9 and 10 as one of the embodiments of the present invention, one starts from the knowledge, that all prescriptions hitherto employed about the dimensioning of the lengths and angles of the individual gear elements supposed to be known by Fig. 2 must be without essential success in the meaning of a period of stillstand of the link E or of the sliding block substituted for the same according to Fig. 10, in the sense of a most favorable period of stillstand adapted to the changing conditions of the link E or of the slide block, as long as a predetermined position of these gear elements relative to the immobility arc of the coupling curve described by the point 1a of the double curve A has not been realised. The stillstand movement of the above mentioned elements of the gear becomes especially great, and therefor especially favorable for the movement of the slay of mechanically driven looms, if the joint 4, connecting the link-motion C—Ca with the link E, for instance of the slay sword or with the sliding block 9, is laid in the centre of the curvature of the immobility arc of a coupling curve described by the point 1a, said curve having to be traced, if this point is shiftable in the machine frame, the end points 3—3 of the link-motion C—Ca were, however, stationarily mounted.

If this total arrangement of the transmission gear is determined in the manner explained above, only the ascertaining, easily made by anyone skilled in the art, of the period of standstill for different lengths of the distance between the points 1a and 4 and of the angle dimensions of the double crank and swing arms of the transmission gear connected with the same, is necessary, in order to obtain the optimum of the standstill. Without the propositions according to the invention, the angle alterations and differences of the arms of the double crank and link-motion remain without success or are accompanied only by an accidental success.

The method according to the invention enables also to considerably increase the efficiency of the same by increasing the number of revolutions of the driving shaft without rebuilding of existing, other slay drives in mechanical looms. It has been shown that, by the positive insertion of longer standstills either only at one or at both reversing positions of the reciprocating rod elements, evidently great improvements in textile-technological respect occur, which in turn permit to increase the number of revolutions and therewith the output of the loom.

If, as is provided in the illustrations according to Figs. 9 and 10, the arms of the double crank A are selected of the same length, and if further similar lengths are given to the connecting rods B—D, and if the arms of the link-motion C—Ca are made equal, symmetrical movement diagrams are obtained. A particular constructive simplicity of the transmission gear is also obtained thereby.

If for instance two standstills have to be attained during the movement of the transmission gear, for instance in the two extreme positions of the link E or of the sliding block 9, which may be of different durations, two arcs must apply on the curved portion of a single coupling curve, and the movement of the point 4 must be laid through the two coordinated centres of curvatures, be it by a link arc-guiding or by a straight guiding.

I claim:

1. A quadruple jointed connection transmitting motion, comprising in combination a shaft rotated by any driving power, two cranks mutually displaced at an angle mounted on said shaft, rods one hingedly mounted on each crank, a swing having two arms forming an angle of less than 180° to which the rotation of the crank shaft is transmitted by said rods, the vertex of the swing constructed as a hinge, a member acting upon the vertex of said swing within the plane of movement laid through the cranks rods and arms of the swing, to which member a reciprocating movement is imparted said member assuming in the reversing points of its movement an actual dead point position overcome by the driving force of the crank shaft, in which for the obtention of a desired absolute standstill of the member hingedly mounted on the vertex of the swing said standstill depending as regards duration and position on the size of the angle between the swing arms, notwithstanding continued rotation of the crank shaft, the hinge point at the vertex of the swing is laid in the curvation centre of the circular section of a closed curve produced at graphic recording, if it is assumed that the crank shaft was arranged movable in its frame whereas the hinge points on the swing were not movably mounted.

2. A quadruple jointed connection transmitting motion, comprising in combination a shaft rotated by any driving power, two cranks mutually displaced at an angle mounted on said shaft, rods one hingedly mounted on each crank, a swing having two arms forming an angle of less than 180° to which the rotation of the crank shaft is transmitted by said rods, the vertex of the swing constructed as a hinge, a member acting upon the vertex of said swing within the plane of movement laid through the cranks rods and arms of the swing, to which member a reciprocating movement is imparted said member assuming in the reversing points of its movement an actual dead point position overcome by the driving force of the crank shaft, in which for the obtention of two absolute standstills for instance in and in the surroundings of the dead point position of the member hinged on the swing vertex, notwithstanding continued rotation of the crank shaft, the vertex hinge point of the swing is laid into the centre of curvature of two circular and uniformly directed sections of a closed curve, said sections separated by a distance, said curve produced at graphic recording if it is assumed that the crank shaft were arranged movable in its frame, whereas the hinge points on the swing were not movably mounted.

3. A quadruple jointed connection transmitting motion, comprising in combination a shaft rotated by any driving power, two cranks mutually displaced at an angle mounted on said shaft, rods one hingedly mounted on each crank, a swing having two arms forming an angle of less than 180° to which the rotation of the crank shaft is transmitted by said rods, the vertex of the swing constructed as a hinge, a member acting upon the vertex of said swing within the plane of movement laid through the cranks rods and arms of the swing, to which member a reciprocating movement is imparted said member assuming in the reversing points of its movement an actual dead point position overcome by the driving force of the crank shaft, in which for the obtention of one absolute standstill in and in the surroundings of the rear dead point position of the member hinged on the vertex of the swing, said standstill occurring between the to and fro stroke, the vertex hinge point of said swing, notwithstanding continued rotation of the crank shaft, is laid in the centre of curvature of the circular section of a closed curve which is produced at graphic recording, if it is assumed that the crank shaft were movably arranged in its frame whereas the hinge points on the swing were not movably mounted, the arms of the cranks being of similar length, the rods connecting the cranks with the swing arms being of same length and the two swing arms of same length mutually forming an acute angle the open side of this angle facing the crank shaft, whereas the vertex hinge of the swing arms acts upon the link lever of a mechanical loom driven by the crank shaft, said link lever being oscillatable about a stationary bearing point.

KARL OTTO.